United States Patent [19]
Byker et al.

[11] Patent Number: 5,805,330
[45] Date of Patent: Sep. 8, 1998

[54] ELECTRO-OPTIC WINDOW INCORPORATING A DISCRETE PHOTOVOLTAIC DEVICE

[75] Inventors: Harlan J. Byker; David J. Cammenga; David L. Poll, all of Holland, Mich.

[73] Assignee: Gentex Corporation, Zeeland, Mich.

[21] Appl. No.: 616,698

[22] Filed: Mar. 15, 1996

[51] Int. Cl.$^6$ ...................................................... G02F 1/15
[52] U.S. Cl. ........................................... 359/265; 359/275
[58] Field of Search ...................................... 359/265, 275

[56] References Cited

U.S. PATENT DOCUMENTS

| | | | |
|---|---|---|---|
| 5,351,151 | 9/1994 | Levy | 359/240 |
| 5,377,037 | 12/1994 | Branz et al. | 359/265 |
| 5,384,653 | 1/1995 | Benson et al. | 359/270 |
| 5,442,478 | 8/1995 | Lampert et al. | 359/273 |
| 5,457,564 | 10/1995 | Leventis et al. | 359/271 |

OTHER PUBLICATIONS

IBM Technical Disclosure Bulletin vol. 17, No. 9, Feb. 1975.
Design Goals and Challenges for a Photovoltaic–Powered Electrochromic Window Covering D. K. Benson et al. Prepared for the First International Meeting on Eletrochromism Oct. 1994, Italy. NREL/TP–452–7461.

*Primary Examiner*—Georgia Yvonne Epps
*Assistant Examiner*—Dawn-Marie Bey
*Attorney, Agent, or Firm*—Brian J. Rees

[57] ABSTRACT

An electro-optic window is provided which is powered solely by at least one discrete photovoltaic cell within an electro-optic window. The electro-optic window has front and back spaced-apart glass elements sealably bonded together in a spaced-apart relationship and defining a chamber filled with an electro-optic material. The front glass element has a transparent conductive layer on the face of the front glass element confronting the rear glass element and the rear glass element has a transparent conductive layer on the face confronting the front glass element. The seal is generally disposed along the perimeter of three edges of both glass elements and some distance in from the remaining (fourth) edge. The photovoltaic assembly is electrically connected to the two transparent conductive layers and is placed on the outer perimeter along this fourth edge with the photon-absorbing side of all the photovoltaic cells within the photovoltaic assembly facing in one direction ("out" the window). When light impinges on the photovoltaic cell a current is created which darkens the electro-optic material in proportion to the amount of impinging light. By choosing the relative area of the photovoltaic assembly to produce the correct current for the electro-optically active window area, the darkening of the electro-optic portion can be directly and accurately controlled without the need for any circuit, wires or shorting resistors.

In addition, an apparatus for making an electro-optic window having two members capable of securing and holding two glass elements in a spaced-apart and parallel relationship is provided. The glass elements may be secured by vacuum-applying members or simple clips. The glass elements may be held in a spaced-apart and parallel relationship by a hydraulic mechanism or by simple spacers placed between the securing members.

18 Claims, 2 Drawing Sheets

ELECTRO-OPTIC WINDOW INCORPORATING A DISCRETE PHOTOVOLTAIC DEVICE

BACKGROUND OF THE INVENTION

The present invention relates to an electro-optic device and, more particularly, to an electro-optic window having enclosed therein at least one photovoltaic device.

Heretofore, devices of reversibly variable transmittance to electromagnetic radiation have been proposed for such applications as the variable transmittance element in variable transmittance light-filters, variable reflectance mirrors, and display devices which employ such light-filters or mirrors in conveying information. These variable transmittance light filters have included windows. Among such devices are those where the transmittance is varied by thermochromic, photochromic, or electro-optic (e.g., liquid crystal, dipolar suspension, electrophoretic, electrochromic, etc.) means and where the variable transmittance characteristic affects electromagnetic radiation that is at least partly in the visible spectrum (wavelengths from about 3800 Å to about 7600 Å). Typically, proposed control schemes for variable transmittance windows either allow the windows to be power controlled window-by-window with a person determining when the window should darken or have all windows controlled by a central computerized power source such that the window is darkened when the sun shines on them or on a sensor placed on a particular side of a building.

Devices of reversibly variable transmittance to electromagnetic radiation, wherein the transmittance is altered by electrochromic means are described, for example, by Chang, "Electrochromic and Electrochemichromic Materials and Phenomena," in Non-emissive Electrooptic Displays, A. Kmetz and K. von Willisen, eds. Plenum Press, New York, N.Y., pp. 155–196 (1976) and in various parts of Eletrochromism, P. M. S. Monk, R. J. Mortimer, D. R. Rosseinsky, VCH Publishers, Inc., New York, N.Y. (1995). Numerous electrochromic devices are known in the art. See, e.g., Manos, U.S. Pat. No. 3,451,741; Bredfeldt et al., U.S. Pat. No. 4,090,358; Clecak et al., U.S. Pat. No. 4,139,276; Kissa et al., U.S. Pat. No. 3,453,038; Rogers, U.S. Pat. Nos. 3,652,149, 3,774,988 and 3,873,185; and Jones et al., U.S. Pat. Nos. 3,282,157, 3,282,158, 3,282,160 and 3,283,656.

In addition to these devices there are commercially available electro-optic devices and associated circuitry, such as those disclosed in U.S. Pat. No. 4,902,108, entitled "Single-Compartment, Self-Erasing, Solution-Phase Electro-optic Devices Solutions for Use Therein, and Uses Thereof", issued Feb. 20, 1990 to H. J. Byker; Canadian Patent No. 1,300,945, entitled "Automatic Rearview Mirror System for Automotive Vehicles", issued May 5, 1992 to J. H. Bechtel et al.; U.S. Pat. No. 5,128,799, entitled "Variable Reflectance Motor Vehicle Mirror", issued Jul. 7, 1992 to H. J. Byker; U.S. Pat. No. 5,202,787, entitled "Electro-Optic Device", issued Apr. 13, 1993 to H. J. Byker et al.; U.S. Pat. No. 5,204,778, entitled "Control System For Automatic Rearview Mirrors", issued Apr. 20, 1993 to J. H. Bechtel; U.S. Pat. No. 5,278,693, entitled "Tinted Solution-Phase Electrochromic Mirrors", issued Jan. 11, 1994 to D. A. Theiste et al.; U.S. Pat. No. 5,280,380, entitled "UV-Stabilized Compositions and Methods", issued Jan. 18, 1994 to H. J. Byker; U.S. Pat. No. 5,282,077, entitled "Variable Reflectance Mirror", issued Jan. 25, 1994 to H. J. Byker; U.S. Pat. No. 5,282,077, entitled "Variable Reflectance Mirror", issued Jan. 25, 1994 to H. J. Byker; U.S. Pat. No. 5,294,376, entitled "Bipyridinium Salt Solutions", issued Mar. 15, 1994 to H. J. Byker; U.S. Pat. No. 5,336,448, entitled "Electrochromic Devices with Bipyridinium Salt Solutions", issued Aug. 9, 1994 to H. J. Byker; U.S. Pat. No. 5,434,407, entitled "Automatic Rearview Mirror Incorporating Light Pipe", issued Jan. 18, 1995 to F. T. Bauer et al.; U.S. Pat. No. 5,448,397, entitled "Outside Automatic Rearview Mirror for Automotive Vehicles", issued Sep. 5, 1995 to W. L. Tonar; and U.S. Pat. No. 5,451,822, entitled "Electronic Control System", issued Sep. 19, 1995 to J. H. Bechtel et al. Each of these patents is commonly assigned with the present invention and the disclosures of each, including the references contained therein, are hereby incorporated herein in their entirety by reference.

Photoelectrochromism is discussed generally in pages 192–197 of Eletrochromism, P. M. S. Monk, R. J. Mortimer, D. R. Rosseinsky, VCH Publishers, Inc., New York, N.Y. (1995). Specifically, section 12.2.3, entitled "Cells Containing Photovoltaic Materials", discusses how a photovoltaic material produces a potential when illuminated and where the photovoltaic material has an internal rectifying field which provides a driving force for the electrons. This section goes on to describe that the voltage created by the photovoltaic material is insufficient, by itself, to darken the electrochromic material. Therefore the electrochromic cell incorporating a photovoltaic material needs an external bias applied which is supplemented by the small photovoltaic-voltage to cause electron transfer to proceed, i.e., have the electrochromic material darken.

U.S. Pat. No. 5,377,037, entitled "Electrochromic-Photovoltaic Film for Light-Sensitive control of Optical Transmittance" to H. M. Branz et al. teaches a variable transmittance optical component which includes a solar cell-type photovoltaic device. The photovoltaic material is deposited over the entire surface of a transparent electrically conductive layer section. The photovoltaic material includes a p-type hydrogenated silicon carbide section, an undoped hydrogenated silicon carbide section, and phosphorous-doped hydrogenated silicon carbide section. A standard solid-state electrochromic multilayer structure is then deposited over the layer of photovoltaic material such that the light traveling through the optical transmitter must travel through the photovoltaic material and through the electrochromic material. The photovoltaic material will absorb some portion of the light and will also create sufficient current to darken the electrochromic material. Solid-state electrochromic devices with good memory, once darkened, will not clear or bleach quickly without an external method of closing the electrochemical circuit, i.e., the device will not clear in a reasonable time even though the "darkening potential" is removed. The device taught by Branz et al. attempts to overcome this significant limitation by connecting a bleeder resistor to the two transparent conductive electrode layers to provide the electric potential and circuit across the device (to slowly bleach the device). In operation, the photovoltaic device produces a DC current which is applied between the transparent conductive layers and across the bleeder resistor. However, it takes a light source with the intensity of 1–2 suns to produce a transmission drop of only 10 percent, in approximately 12–13 minutes. Thus, incorporating a bleeder resistor complicates the circuitry required for the window system and also draws some power that otherwise could be used in darkening.

U.S. Pat. No. 5,348,653, entitled "Stand-Alone Photovoltaic (PV) Powered Electrochromic Window" to D. K. Benson et al. teaches a variable transmittance double pane window including a five-layer solid state electrochromic portion, an array of photovoltaic cells with a n-type conductivity region on the front side of a p-type silicon substrate, and an external switch-containing circuit. The photovoltaic cells are deposited directly on the glass and not on the transparent electrode. The photovoltaic cells and the battery circuit are connected in parallel to the electrochromic portion of the device. This allows selective activation of the electrochromic portion to either a substantially opaque state or a substantially transparent state by switching the external switch-containing circuit between having the photovoltaic devices drive the device to a dark state, or to a transparent state or having the battery device drive the device to a transparent state when the conditions are such that the incident sunlight is not sufficient for the photovoltaic array to produce the required energy. Again, solid-state electrochromic devices with good memory, once darkened, will not clear in a reasonable amount of time absent some method of closing the circuit, typically by applying a bleaching potential.

U.S. Pat. No. 5,457,564, entitled "Complementary Surface Confined Polymer Electrochromic Materials, Systems, and Methods of Fabrication Therefore" to Leventis et al. teaches an electrochromic device having polypyrrole-prussian blue composite material on the oxidatively coloring electrode and a heteroaromatic substance with at least one quaternized nitrogen on the reductively coloring electrode. Preferably, either the oxidative or reductive polymer is electro-deposited onto a metallic oxide to increase the cycle life of the device to an acceptable level. Leventis et al. also teaches using an external photovoltaic cell to generate power to darken the electrochromic device. The photovoltaic cells operate as forward biased diodes and allow current to flow in the opposite or "reverse" direction. Further, Leventis et al. places the photovoltaic cells behind the electrochromic device such that the light which drives them must first travel through the electrochromic material. As the degree of colorization of the device increases, the intensity of light impinging on the photovoltaic cells decreases and the output from the photovoltaic cells decreases, creating a limit of how much light the device can block.

When retrofitting windows it is disadvantageous to have to run wires to each window to supply the external bias. Furthermore, even when installing electrochromic windows into a new building it would be easier and less expensive if no wires were needed to supply an external bias or no external circuit were necessary to help control colorization or bleaching of the window.

Consequently, it is desirable to provide an improved electro-optic window having an improved photovoltaic drive mechanism.

OBJECTS OF THE INVENTION

Accordingly, a primary object of the present invention is to provide an electro-optic window having a discrete photovoltaic device integrally combined with the electro-optic window where no external drive voltage is needed, no bleaching circuit is required, and no external wiring is necessary.

SUMMARY OF THE INVENTION

The above and other objects, which will become apparent from the specification as a whole, including the drawings, are accomplished in accordance with the present invention by enclosing within an electro-optic device a discrete photovoltaic assembly which is capable of driving the electro-optic medium. The electro-optic device has front and back spaced-apart glass elements sealably bonded together defining a chamber filled with an electro-optic material. The front glass element has a transparent conductive layer on the face confronting the rear glass element and the rear glass element has a transparent conductive layer on the face confronting the front glass element. The seal is generally disposed some small distance from the perimeter of three edges of both glass elements and some greater distance in from the remaining (fourth) edge. The photovoltaic assembly is placed between the two glass elements on the outer perimeter along this fourth edge with the photon-absorbing (active) side of all the photovoltaic cells within the photovoltaic assembly facing in one direction. Alternately, the photovoltaic assembly or an array of assemblies may be placed in a sealed off region or regions any place within the window area and may even be in the form of a decorative design, such as a diamond, circle, and the like, and may assist in providing and maintaining the spacing between the transparent conductor-coated glass elements. The photovoltaic assembly is electrically connected to the two transparent conductive layers and when light impinges on the photovoltaic cell an electrical potential is generated which darkens the electro-optic material in proportion to the amount or intensity of impinging light. By choosing the relative area of the photovoltaic assembly to produce the correct current for the electro-optically active window area, the amount of darkening of the electro-optic portion can be directly and accurately controlled without the need for any circuit, wires or shorting resistors.

In addition, an apparatus for making an electro-optic window having two members capable of securing and holding two glass elements in a spaced-apart and parallel relationship is provided. The glass elements may be secured by vacuum-applying members or simple clips. The glass elements may be held in a spaced-apart and parallel relationship by a hydraulic mechanism or by simple spacers placed between the securing members.

BRIEF DESCRIPTION OF THE DRAWINGS

The subject matter which is regarded as the invention is particularly pointed out and distinctly claimed in the concluding portion of the specification. The invention, together with further objects and advantages thereof, may best be understood by reference to the following description taken in connection with the accompanying drawings, where like numerals represent like components, in which:

DETAILED DESCRIPTION

Figure 1:
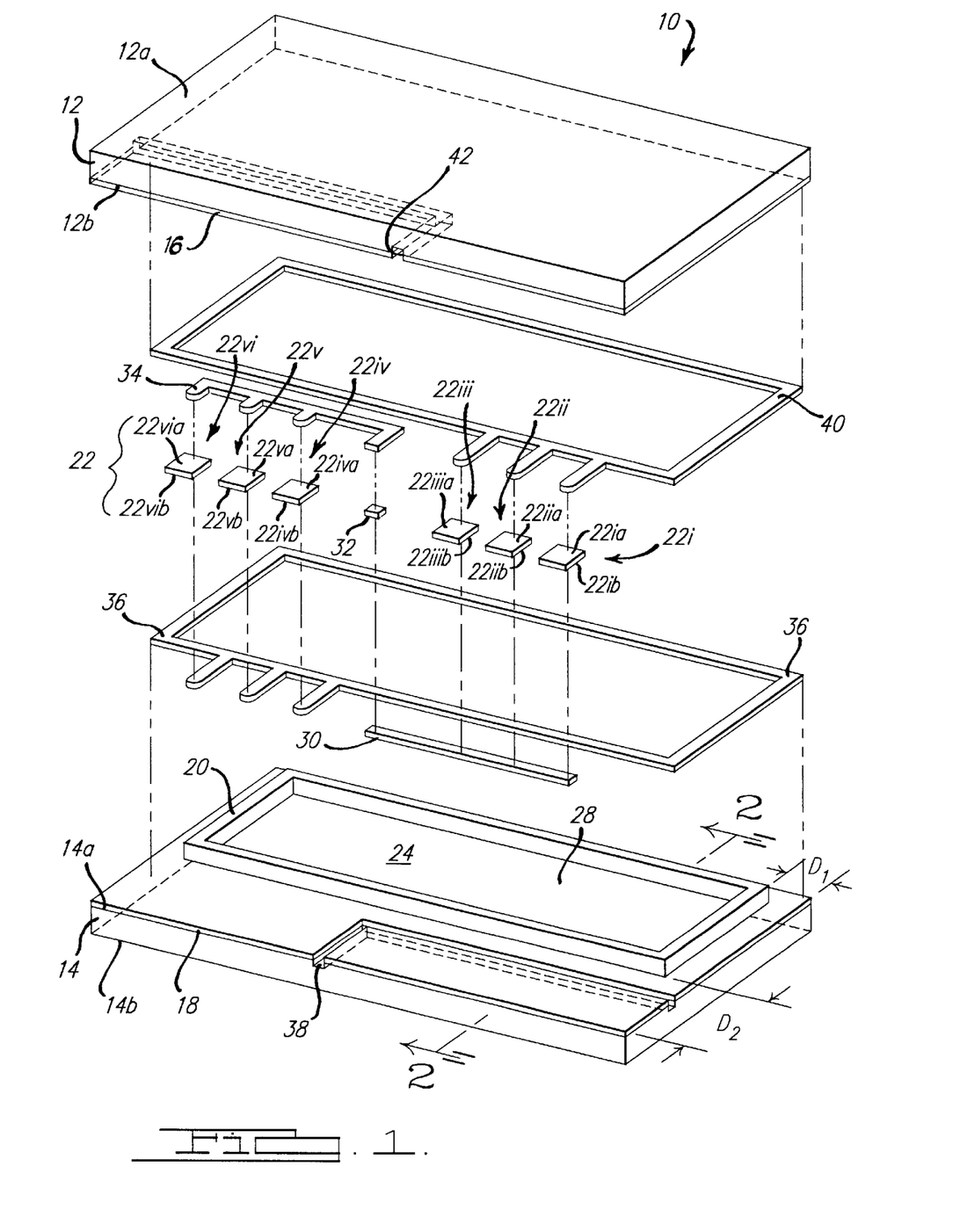
FIG. 1 shows an exploded perspective view of a photovoltaic-powered electro-optic window.

FIG. 1 is an exploded perspective view of a photovoltaic-powered electro-optic device 10 having a first transparent element 12 with a front face 12a and a rear face 12b, and a rear element 14 having a front face 14a and a rear face 14b. By electro-optic device we mean variable transmittance light-filters, such as, for example, windows; variable reflectance mirrors; and display devices which employ such light-filters or mirrors in conveying information. Although the following description discusses electrochromic windows, the preferred embodiment of the present invention, it will be understood by those skilled in the art that the present invention may be utilized in any of the above-referenced electro-optic devices. Further, since some of the layers of the electro-optic window 10 are very thin, the scale has been distorted for pictorial clarity. Front transparent element 12 and rear transparent element 14 may be any one of a number of materials which are transparent in at least part of the visible region of the electromagnetic spectrum and have sufficient strength to be able to operate in the conditions, e.g., varying temperatures and potential impact from hail and other flying objects such as birds, commonly experienced by a window. For example, elements 12 and 14 may comprise various types of glass, including soda lime float glass, polymers or plastic sheet materials, and the like, with glass being preferred. Elements 12 and 14 may possess LTV barrier properties to help protect the electro-optic material 28. The thicknesses of elements 12 and 14 are well known in the art and typically range from about 1 millimeter to about 6 millimeters.

A layer of a transparent electrically conductive material 16 is deposited on the rear face 12b of the first element 12 to act as an electrode, and another layer of a transparent electrically conductive material 18 is deposited on the front face 14a of the second element 14. Both transparent conductive materials 16 and 18 generally cover the entire surface onto which they are deposited, i.e., 12b and 14a, respectively. The layers of transparent conductive materials 16 and 18 may be the same or different and may be any material which adheres well to front element 12 and rear element 14, is resistant to adverse interaction with any materials within the electro-optic window that elements 12 and 14 come into contact, is resistant to adverse interaction with the atmosphere, has minimal diffuse or specular reflectance, high light transmission, and good electrical conductance. Layers of transparent conductive material (16 and 18) may be fluorine doped tin oxide, tin doped indium oxide (ITO), thin metal layers, ITO/metal/ITO (IMI) as disclosed in "Transparent Conductive Multilayer-Systems for FPD Applications", by J. Stollenwerk, B. Ocker, K. H. Kretschmer, 1995 Display Manufacturing Technology Conference Digest of Technical Papers, SID, p 111, and the materials described in above-referenced U.S. Pat. No. 5,202, 787, such as TEC 20 or TEC 15, available from Pilkington, Libbey Owens-Ford Co. of Toledo, Ohio. Generally, the conductance of the layers of transparent conductive materials (16 and 18) will depend on their thickness and composition if ITO or fluorine doped tin oxide is used. The thickness of either layer may range from about 500 Å to about 5000 Å, and is preferably from about 1400 Å to about 3500 Å. IMI, on the other hand, may have superior conductivity compared with the other materials, but is generally more difficult and expensive to manufacture and therefore may be useful in applications where high conductance is desirable. The thickness of the various layers in the IMI structure may vary but generally the thickness of the first ITO layer ranges from about 150 Å to about 1000 Å, the metal ranges from about 10Å to about 250Å and the second layer of ITO ranges from about 150 Å to about 1000 Å. The metals for the intermediate layer may be silver, gold, and the like. There may be additional layers of metal and ITO if desired, e.g., IMIMI. Also, an optional layer or layers of an anti-iridescent, an antireflection and/or a color suppression material or materials (not shown) may be deposited between transparent conductive material 16 and front glass rear face 12b and/or between transparent conductive material 18 and rear glass front face 14a to suppress or filter out any unwanted portion of the electromagnetic spectrum.

Figure 2:
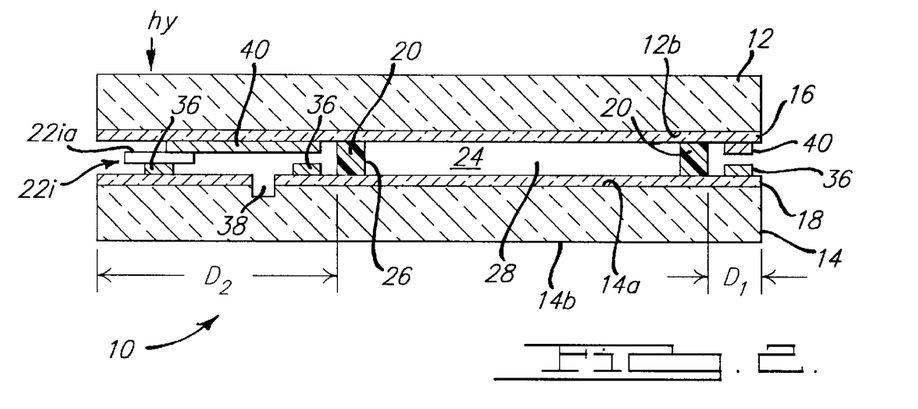
FIG. 2 shows a cross-sectional view of the electro-optic window of FIG. 1 taken along the lines 2—2.

As is shown in FIG. 2, front glass element 12 is sealably bonded to rear glass element 14 in a spaced-apart and parallel relationship by a sealably bonding member 20 disposed between and adhered to transparent conductive layers 16 and 18. Sealably bonding member 20 is generally disposed some distance D1 in from the outer perimeter of three edges of both second face 12b and third face 14a and is disposed some distance D2 in from the fourth edge. Sealably bonding member 20 may be any material which is capable of adhesively bonding the layers of transparent conductive material 16 and 18, while, after curing, being capable of maintaining a generally constant distance therebetween. Sealably bonding member 20 should also preferably not be permeable to water or oxygen in any significant degree, and should be generally inert to an electrooptic material 28 disposed in chamber 24 (both of which are described in more detail hereinbelow). Sealably bonding member 20 generally comprises a strip or gasket of a polymeric material, such as rubbers, urethanes, acrylates, epoxies and the like, with epoxies being presently preferred.

Chamber 24, defined by transparent conductive material 16 (disposed on front element 12), transparent conductive material 18 (disposed on back element 14), and an inner circumferential wall 26 of sealing member 20, is filled with an electro-optic medium 28. Electro-optic medium 28 may be a wide variety of materials capable of changing properties such that light traveling therethrough is attenuated (e.g., liquid crystal, polymer dispersed liquid crystal (PDLC), dipolar suspension, electrophoretic, and electrochromic, etc.). Electro-optic devices incorporating a PDLC medium generally required higher voltages and further require a number of cells placed in series to obtain adequate light attenuation. The presently preferred electro-optic media are electrochromic, which may be further broken down into the sub-categories of solution-phase, surface-confined, electrodeposition, or combinations thereof. The electrochromic media disclosed and claimed in above-referenced U.S. Pat. Nos. 4,902,108; 5,128,799, 5,278,693; 5,280,380; 5,282, 077; 5,294,376; 5,336,448, are the presently preferred electrochromic media whether they are in a liquid solution-phase or free-standing gel-type solution-phase. However, the most preferred electrochromic media are free-standing gel-type, such as those described in co-pending U.S. patent application Ser. No. 08/278,913, entitled "Electrochromic Layer and Devices Comprising Same" to W. L. Tonar et al., or in co-filed U.S. patent applications entitled "Electrochromic Layer and Devices Comprising Same" filed on or about Mar. 15, 1996 to W. L. Tonar et al all of which are hereby incorporated herein in their entirety by reference. Electrochromic medium 28 is inserted into chamber 24 through a sealable fill port or ports (not shown) through well known techniques such as injection, vacuum backfilling and the like. If a gel is used, it is filled as a liquid and gelled in accordance with the teachings of either of these U.S. patent applications.

In accordance with the present invention, at least one discrete photovoltaic assembly 22 is enclosed within (or placed between) the two layers of transparent conductive material (16 and 18) such that the photon absorbing side 22ia–via of each individual photovoltaic cell 22i–vi is facing one direction, i.e., out the front face 12a of front element 12. Although shown in FIG. 1 as two sets of photovoltaic cells, those skilled in the art will realize that photovoltaic assembly 22 may be one or more sets of cells and may even be a single cell. An important aspect of the present invention is placing photovoltaic assembly 22 between the two layers of conductive materials (16 and 18). This allows the glass elements (12 and 14) to protect the assembly 22 from damage and, since the photovoltaic assembly 22 is in direct contact with the transparent conductive materials, the need for any external wiring or circuitry is eliminated. The unexpected benefits of this simple design should not be overlooked. Since no clips or other electrical connection mechanisms are needed to connect the conductive materials to an external circuit there are no concerns with the contact stability between the conductive materials and the clips. Furthermore, no separate housing need be constructed for the photovoltaic cells which simplifies the design and decreases the overall costs of the window 10. Finally, as will become more clear by the discussion hereinbelow, the window of the present invention has a cell spacing which uniquely matches commercially available photovoltaic cells. This allows the window design to be simpler in that no wires need to be run to interconnect the photovoltaic cells and the transparent conductive materials (16 and 18).

As those skilled in the art will understand, the design of photovoltaic assembly 22 may vary in the placement of the photovoltaic cells 22i–vi, in the composition of the photovoltaic cells and in the number and arrangement of the electrical connection of the photovoltaic cells. For example, some photovoltaic cells can be produced in sufficient size to allow only two cells electrically connected in series. Furthermore it may be possible to produce a single photovoltaic cell which produces the voltage and current necessary to drive the electrochromic window 10. Finally, the only restriction on the photovoltaic assembly 22 is that it be placed between the two layers of transparent conductive materials (16 and 18). In fact, it is possible to place the assembly 22 in the center of the chamber 24, provided the photovoltaic cells 22i–vi are not shorted by the electrochromic material 28. This may be accomplished by having a seal disposed around the assembly 22 to ensure there is no contact with the electrochromic media 28. In this case, connection to the bus bars (36 and 40) may be made by conductive strips brought into the center of the window 10. Each discrete photovoltaic device in assembly 22 may have a distinct shape and each device may be arranged in such a way that the entire assembly 22 has a particular design such as diamond, circle, or other known or unique configuration. Alternatively, an array of photovoltaic cells may be distributed throughout the window area, with no bus bars, such that each photovoltaic cell produced enough potential to drive a portion of the electrochromic media 28 around it, and the density of the photovoltaic cells are such that the entire electrochromic material 28 is capable of being darkened. Since the cell spacing of the window is comparable to the thickness of a typical photovoltaic cell, the photovoltaic cells may be optionally used to provide and maintain spacing between the glass elements (12 and 14). An electrochromic window made in accordance with the preferred embodiment of the present invention has a cell spacing which ranges from about 100 microns to about 5000 microns and, more typically has a cell spacing from about 300 microns to about 3000 microns.

Photovoltaic devices or solar cells are well known and may comprise a wide variety of p-n junction and Schottky barrier devices comprising materials such as, but not limited to, polycrystalline-, amorphous- and single crystal-structures of silicon, gallium arsenide, gallium phosphide, indium phosphide and indium antimonide, as well as amorphous cadmium sulfide, cadmium selenide, copper indium selenide, copper indium selenide/cadmium sulfide, and the like. The amorphous structures can be made into thin films which can be easily bonded onto a layer of transparent conductive material and, therefore, allow a plurality of photovoltaic cells to be electrically connected in series (discussed in detail hereinbelow). This makes manufacturing of the overall electrochromic window 10 easier and less costly. The presently preferred photovoltaic cells are single crystal and polycrystalline silicon cells.

One important aspect to selecting the size and structure of the photovoltaic assembly 22 is to ensure that the voltage and current output of assembly 22 matches the voltage and current necessary to darken and accurately control the amount of darkening of the electro-optic window 10. The presently preferred electro-optic device is a self-erasing electrochromic window. In such a system the intensity of electromagnetic radiation is modulated or attenuated by passing through electrochromic media 28 which is in contact with transparent conductive materials 16 and 18. Typically the media 28 includes at least one anodic compound and at least one cathodic compound. The anodic compound is electrochemically oxidized and the cathodic compound is electrochemically reduced when a DC electrical potential difference is impressed across the electrochromic media 28. The self-erasing property of the present invention means that, after a potential difference between the electrodes of a device is decreased or eliminated, the transmittance of the solution in the device will increase spontaneously, without need of reversal of the polarity of the electrodes or a bleeder resistor or an external switch, to a value characteristic of the new potential difference. The self-erasing feature is provided by the spontaneous, apparently diffusion-limited, reactions of oxidized anodic compound with reduced cathodic compound to yield anodic compound and cathodic compound in their respective zero-potential equilibrium states. The electrochromic device 10 may be a hybrid between a surface confined electrochromic material on one transparent electrode and a solution phase electrochromic material. In a hybrid system, diffusion from the other transparent electrode to the surface confined electrochromic material provides the self-erasing feature when power is removed or decreased.

This is especially important for a photovoltaic-powered device of the present invention. As the sun rises and begins to impinge on the window (and the photovoltaic device), the photovoltaic device generates a current which travels to the two layers of the transparent conductive materials (16 and 18) and a certain electrical potential (P1) is impressed across (and darkens) the electrochromic media 28. When the potential is sufficient for current to flow through an all solution phase electrochromic media 28, the anodic material is continually being oxidized and the cathodic material is being reduced to replace the anodic and cathodic compounds which diffuse away from the transparent conductive layers and spontaneously react to form non-colored species in the bulk of media 28. As the sun continues to rise, more light hits the window and more power is generated by the photovoltaic assembly 22 and impressed on the window, the electrochromic media 28 darkens further. As the sun begins to set, less light hits the window and less power is generated by the photovoltaic assembly 22 and impressed on the window. The transmittance of the electrochromic media 28 spontaneously increases to a new level because the number of species being electrochemically colored is less than before. No other system allows for this simple and accurate auto-adjustment without complicated circuitry.

Although this surprising feature has significant advantages, it is important to ensure that the photovoltaic cells are chosen such that the output matches the requirements of the electrochromic window 10. Generally speaking, the photovoltaic cells should make up less than about 10 percent of the total area of the electrochromic window 10, whether placed along the edge or in the center of the window 10. For example, an electrochromic window 10 made with the electrochromic materials disclosed and claimed in U.S. patent application Ser. No. 08/278,913, entitled "Electrochromic Layer and Devices Comprising Same" to W. L. Tonar et al., needs a voltage range of about 0.4 volts to about 1.2 volts and a current range from about 500 microamps per squared centimeter to about 1 microamp per squared centimeter. More typically the current ranges from about 100 microamps per squared centimeter to about 1 microamp per squared centimeter. Photovoltaic devices are well known in the art and their voltage and current output can be adjusted simply by adjusting the size of the device and/or by electrically connecting one or more devices in series. It is possible to have a single photovoltaic device produce from about 0 to about 2.0 volts when exposed to radiant energy ranging from about 0 watts per square centimeter to about 1,000 watts per square centimeter. Therefore, given the window's 10 specified output, simple experimentation will lead one skilled in the art to match the photovoltaic assembly with what is required for the window 10. For example, for a dipolar suspension device operating at 20 volts approximately 30–40 silicon photovoltaic cells could be connected in series to supply the required voltage. For a polymer dispersed liquid crystal device operating at 100 volts approximately 150 to 200 photovoltaic cells in series would be needed.

Photovoltaic assembly 22 is made up of at least one photovoltaic cell if silicon is used with an electrochromic device made in accordance with the teachings of above-referenced U.S. patent application Ser. No. 08/278,913. Assembly 22 is preferably made up of one or more sets of photovoltaic cells electrically connected in series. FIG. 1 shows six photovoltaic cells 22i through 22vi set up in two sets of three cells, i.e., 22i–iii electrically connected together in series with 22iv–vi. Thus each set of three cells produces a voltage of approximately 0 to about 0.6 volts depending on the brightness of the sun and, when electrically connected in series, produce a voltage of about 0 to about 1.2 volts. As those skilled in the art will realize, it is possible to combine more sets in series to produce higher voltages. Such a setup allows gray-scale control in that the level of visible light transmittance of electrochromic material 28 in chamber 24 is continuously variable from a transmittance value of typically about 80 percent to a transmittance of typically about 4 percent. This variable transmission is controlled by the amount of light impinging on the photovoltaic assembly 22 and therefore the power output from photovoltaic assembly 22 relative to the power requirements of the window 10 to achieve a given level of darkening. This control of the level of darkening is automatic if the area and efficiency of the photovoltaic assembly 22 is scaled to the area and power requirements of the window 10. However, if desired the transmittance may be more narrow to provide some tint at all times, for example, the range may be from about 50 percent to about 10 percent transmittance. In addition, in some climates it may also be desirable to provide for a covering for the photovoltaic area if there was a desire to prevent the window from darkening. This would be particularly useful in climates which experience large temperature variations. For warm weather conditions, the window could be allowed to darken as a result of the solar illumination. In cold weather, the photovoltaic area might be covered to prevent the window from coloring which will allow maximum sunlight to enter the building to provide light and heat.

Referring specifically to FIG. 1, in operation, light impinges on the top surfaces 22ia–via of cells 22i–vi. The light impinging on cell surfaces 22ia–iiia provides a certain voltage output which depends on the composition and size of the photovoltaic cells 22i–vi, current draw of the window 10 and the intensity of the impinging light. The current path leads out the bottom surfaces 22ib–iiib of photovoltaic cells 22i–iii and travels to the top surfaces 22iva–via of photovoltaic cells 22iv–vi through bus bar 30, via interconnect 32 and bus bar 34. Bus bars 30 and 34 may be made of any material which will ensure that photovoltaic cells 22i–iii are conductivity adhered to the layer of transparent conductive material 18, and cells 22iv–vi are consecutively adhered to the layer of transparent conductive material 16, respectively. The bus bars 30 and 34 may comprise a layer of deposited metal, silver paint, a conductive frit, a spring clip, or a combination thereof. The presently preferred material for bus bars 30 and 34 is 112–15 which is a silver ink made by Creative Materials Inc., in Tynsboro, Mass. Interconnect 32 ensures a current path between the bus bar 30 and bus bar 34 and may be any conductive material, such as a strip or roll of copper, a silver epoxy, or other materials well known in the art for use as conductive interconnects. Assuming cells 22i–iii and 22iv–vi each produce approximately 0.6 volts, then approximately 1.2 volts are applied between the layers of transparent conductive materials (16 and 18) through bus bar 36. Channel 38 extends through transparent material 18 and optionally through a small portion of second glass element 14 such that none of the current transmitted through bus bar 36 to material 18 is allowed to reach cells 22i–iii without passing though electro-optic material 28 in chamber 24. Channel 38 also ensures that the current produced by cells 22i–iii must travel through via interconnect 32, through cells 22iv–vi and bus bar 36 before contacting that portion of material 18 in contact with electrochromic media 28. The potential difference between transparent materials 16 and 18 causes the electro-active species within electrochromic material 28 to be either reduced or oxidized thereby allowing current flow through medium 28. As a result, the window 10 darkens, i.e., attenuates, the light traveling therethrough. Transparent coating 16 is in electrical contact with bus bar 40 which carries the current back to the top surfaces 22ia–iiia of cells 22i–iii to complete the electrical circuit. Channel 42 extends through transparent coating 16 and optionally through a small portion of first glass element 12 such that none of the voltage transmitted through bus bar 40 to cells 22i–iii is allowed to reach cells 22iv–vi without being transmitted though cells 22i–iii. Bus bars 36 and 40 may also comprise a layer of deposited metal, silver paint, a conductive frit, a spring clip, or the presently preferred silver ink. Bus bars 36 and 40 are disposed along the outer periphery of sealing member 20 and, as shown in FIG. 2, are not in electrical contact with one another other than through assembly 22 and electrochromic media 28. Other methods of achieving series/parallel connections of the photovoltaic cell assembly 22 are known in the art, but the above is presently preferred.

Figure 3:
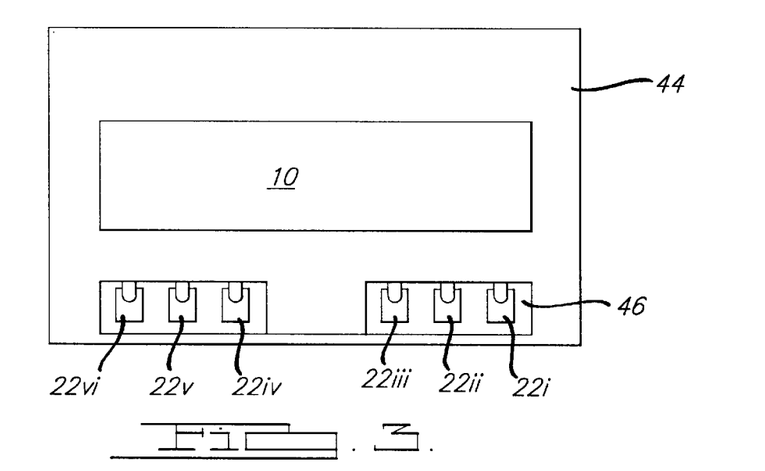
FIG. 3 shows a perspective view of the electro-optic window of FIG. 1 in a frame assembly.

Referring to FIG. 3, electro-optic windows embodying the present invention may include a frame 44 which extends around the entire periphery of electro-optic window 10. The frame 44 conceals and protects the peripheral edge portions of sealing member 16 and both the front and rear glass elements (12 and 14, respectively). A wide variety of frame designs are well known in the art of window manufacturing. Frame 44 has an opening 46 allowing photovoltaic cells 22i–vi a clear view of the sunlight which is impinging on the window 10.

The following examples are intended to describe certain embodiments of the present invention and should not be interpreted in any manner as limiting the scope of the invention as set forth in the accompanying claims.

EXAMPLE 1

A self-erasing, solution-phase electrochromic window may be produced having an active electrochromic area approximately 25 cm×30 cm with a cell spacing of approximately 890 microns. The window will have concentrations of anodic and cathodic electrochromic materials of about 6 mM each and approximately 5% by volume of polymethylmethacrylate dissolved in propylene carbonate as a solvent. The anodic material is 5,10-dihydro-5,10-dimethylphenazine and the cathodic material is 1,1'-di(phenylpropyl)-4,4'-dipyridinium difluoroborate. Such a window will require approximately 1 volt to reduce the transmission of the window from above 70% to below 10% and 20 mA of current to maintain a steady-state darkened condition.

For two sets of p-n junction silicon photovoltaic devices connected in series, a solar illumination of 500 W/m2 will produce a current output of $2.5$ $mA/cm^2$ of photovoltaic cell area at 1.0 volt. A minimum photovoltaic area of 8 cm 2 will be required to produce the 20 mA necessary to darken the electrochromic window in this example.

EXAMPLE 2

Propylene carbonate was added to a reaction flask and deoxygenated with dry nitrogen. 20 weight percent of monomers were added to the reaction flask in the molar ratio of 1 part 2-hydroxyethyl methacrylate (HEMA) to 5 parts methyl methacrylate (MMA). The MMA was purified by through distillation at atmospheric pressure using a short neck distillation column. The HEMA was purified by distillation at approximately 3 mm-Hg using a short neck distillation column. The reaction flask was heated to 70 degrees Celsius and a free radical initiator (V601 {Dimethyl 2,2'-Azobis (2-methylpropionate)} (Dimethyl 2,2'-azobisisobutyrate) was added. When the viscosity of the resulting solution increased noticeably, more propylene carbonate (at reaction temperature) was added to the flask. The reaction was continued until completion with the resulting weight percent of the pre-polymer being 10 percent. The pre-polymer solution was diluted to 5% by weight with propylene carbonate. 30 millimolar of Tinuvin p was added to and dissolved in the pre-polymer solution. 3 millimolar of 1,1'-di(3-phenyl(n-propyl)-4,4'bipyridinium and 3 millimolar 5,10-dihydro-5,10-dimethylphenazine were added to the pre-polymer solution. This solution was degassed by vacuum and flushed with nitrogen. Sufficient tolylene diisocyanate crosslinker was added to crosslink approximately 60 percent of the theoretical hydroxyl positions. This solution was thoroughly mixed to ensure that the crosslinker was evenly distributed throughout the fluid.

A part was assembled which was large enough to allow observation of its performance over long periods of time in a use similar to that proposed for an electrochromic window. Two glass elements coated with a fluorine doped tin oxide transparent conductive coating were cut to the desired size. An epoxy seal material was dispensed on one of the glass elements, then both glass elements were placed on half inch glass vacuum platens. The platens were then held apart with metal spacers and placed in a near vertical position. The platen assembly was then placed in an oven to cure the epoxy. This assembly had the dimensions of about 100 cm by 140 cm, and had an interpane space of about 1.5 millimeters. The solution was introduced into the device.

The electrochromic polymer solution had reached its gel point within 3 days of adding the crosslinking agent. Crosslinking may either be continued at room temperature or may be optionally accelerated by placing the part in a warm oven, e.g., 70 degrees Celsius.

After the electrochromic solution was cured, its function was tested by applying 1.0 volts. Transmission of these parts in the bleached state is 78%. In the fully darkened state the transmission is 5%. The transmission went from 78 to 5 in around 20 minutes and colors from the edges to the center. Brush marks and streaks are apparent especially at transition levels in transmission. The marks and streaks became more apparent over time. The window requires approximately 60 mA to maintain steady-state transmission of the window at about 5% for visible light.

For two sets of p-n junction silicon photovoltaic devices connected in series with a solar illumination of 500 W/m2 with a current output of 2.5 mA/cm2 at 1.0 volts, a minimum photovoltaic area of 24 cm2 would be required to produce the 60 mA necessary to maintain the darkened condition of the electrochromic window in this example.

Liquid crystal devices and some types of electrochromic devices, e.g., solution phase-, gel- and hybrid-types, require uniform spacing between the two glass elements (12 and 14). This uniform spacing is needed to ensure even and uniform darkening as well as to minimize any double imaging problems. Also, as stated above, the cell spacing of the electrochromic window 10 of the present invention are surprisingly matched to the thickness of commercially available photovoltaic cells. Although it is common practice in the electro-optic art, in some instances utilizing the photovoltaic cells, or other objects such as glass beads and the like between the glass elements (usually in the seal), as an internal cell spacer is not the presently preferred method for ensuring uniform cell thickness. The reason for this is that these spacers are either fragile or rigid, both of which have associated manufacturing problems. When the seal material 20 of the present invention cures is shrinks. As the spacing between the glass elements 12 and 14 increases, so does the amount of seal material which must be used to fill seal the space. As the thickness of the seal material 20 increases so does the amount it shrinks during cure. Therefore, if the photovoltaic cells are used by themselves as a spacer element they will be damaged as the glass elements 12 and 14 move toward one another as the seal material 20 shrinks during cure. If glass beads are used, high stress will develop between the beads and the glass elements 12 and 14 as the seal material 20 tries to shrink. When the cell spacing exceed approximately 300 microns, this stress may be high enough to break the glass elements (12 and/or 14). Further, this higher stress in the seal makes the seal less durable to thermal and mechanical stresses experienced when the devices is exposed to variable enviromnental conditions.

One method for reducing this stress is to use a flexible seal material, however, flexible seals have their own operational deficiencies in that they do not have adequate oxygen- and moisture-barrier properties. If oxygen or moisture are able to permeate the seal they can degrade the electrochromic system and cause the window to not function properly. Thus, although rigid seals are preferred due to their barrier properties an improved method is needed to bond the assembly together (prior to filling the chamber 24 with electrochromic medium 28).

Figure 4:
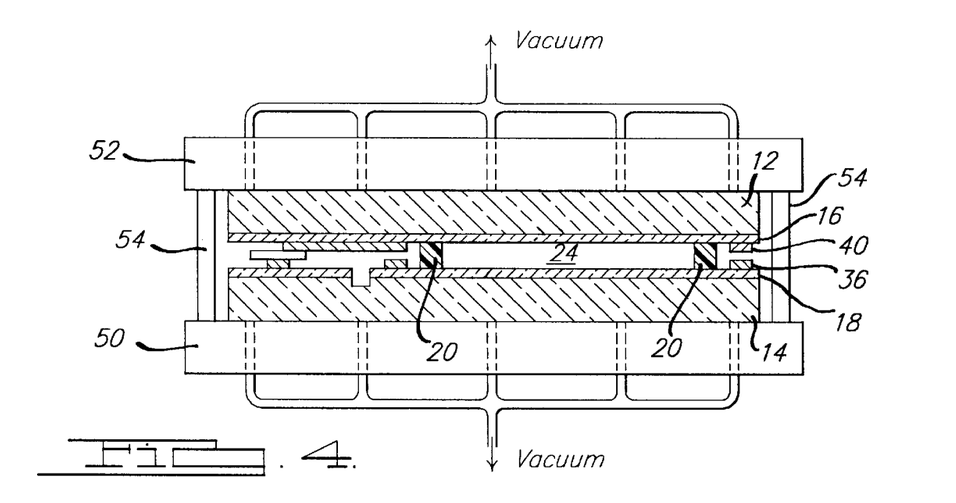
FIG. 4 shows a cross-sectional view of an apparatus used in the assembly of an electro-optic window.

In accordance with another embodiment of the present invention, a spacerless electrochromic window 10 is provided, as is the method for producing such a device. A key aspect of this embodiment is ensuring that the glass elements 12 and 14 are held in a spaced-apart and parallel relationship while the seal material 20 cures. The substrates can be held by a variety of methods, including edge clamps, edge clips and vacuum chucking, with a vacuum chucking system being preferred. Typically a near vertical cure is preferred to reduce the amount of sag the substrates experienced as a result of gravitational pull, however, with a vacuum chucking system, since both glass elements are held to a planar vacuum substrate, the glass elements may be bonded in a horizontal orientation. Referring to FIG. 4, two vacuum-applying members 50 and 52 are provided to contact glass elements 12 and 14 on the sides which are most remote form each other (i.e., the sides that do not confront one another) and apply a vacuum to each glass element. The sealably bonding material 20 is disposed along the periphery of one of the transparent conductive coatings, e.g., material 18, and the second glass element (i.e., transparent coating 16) is brought into a spaced-apart and parallel relationship with the first glass element such that the circumferential edges of each glass element are substantially aligned. Finally, sufficient heat of UV light is applied to uniformly and completely cure seal material 20. The vacuum-applying members can be held in the spaced apart relationship by a simple spacer 54 such that, as the seal member 20 cures and contracts, the glass elements 12 and 14 may pull away from the vacuum-applying member and reduce the stress in the seal member 20. In a more complicated system, the two vacuum-applying members 50 and 52 can be held in a spaced-apart and parallel relationships by a hydraulics system (not shown) well known in the art. Optionally, the vacuum-applying members can have embedded heaters, or the entire assembly can be heated with infra-red radiation, a convection heating oven or other methods well known in the art. It is important, however, that the seal member 20 be heated or, when a UV curing epoxy is utilized have radiation applied, in a uniform manner to prevent uneven curing which can produce inconsistencies in the spacing of the substrates.

While the invention has been described in detail herein in accordance with certain preferred embodiments thereof, many modifications and changes therein may be effected by those skilled in the art. Accordingly, it is our intent to be limited only by the scope of the appending claims and not by way of the details and instrumentalities describing the embodiments shown herein.

What is claimed is:

1. An electro-optic window comprising a self-erasing electro-optic variable transmittance component comprising
   (a) front and rear spaced transparent elements, each having front and rear faces, said rear face of said front element and said front face of said rear element sealably bonded together in a spaced-apart relationship to define a chamber therebetween;
   (b) a first layer of transparent electrically conductive material disposed on said rear face of said front element, and a second layer of a transparent electrically conductive material disposed on said front face of said rear element; and
   (c) said chamber containing a self-erasing electro-optic reversibly variable transmittance medium in contact with said first and second layers of transparent electrically conductive materials;
where said variable transmittance component has enclosed therein one or more discrete photovoltaic cells for producing a voltage when exposed to radiant energy and further having means for conveying said voltage from said one or more discrete photovoltaic cells to said variable transmittance component to cause variations in the transmittance of light through said window.

2. The electro-optic window of claim 1, where at least one of said first and second layers of transparent electrically conductive material comprise a material selected from the group consisting essentially of fluorine-doped tin oxide, ITO, a thin layer of metal, a multi-layer construction of ITO/metal/ITO, and combinations thereof.

3. The electro-optic window of claim 2, where at least one of said first and second layers of transparent electrically conductive material has a sheet resistance ranging from about 1.0 ohms per square to about 40 ohms per square.

4. The electro-optic window of claim 2, where said first layer of ITO in said multi-layer transparent electrically conductive material ranges in thickness from about 150 Å to about 1000 Å, and where said layer of metal in said multi-layer transparent electrically conductive material ranges in thickness from about 10 Å to about 150 Å, and where said second layer of ITO in said multi-layer transparent electrically conductive material ranges in thickness from about 150 Å to about 1000 Å.

5. The electro-optic window of claim 4, where said metal is selected from the group selected from silver, gold, rhodium, platinum, aluminum, and combinations thereof.

6. The electro-optic window of claim 5, where the sheet resistance of said multi-layer transparent electrically conductive material ranges from about 0.5 ohms per square to about 15 ohms per square.

7. The electro-optic window of claim 1, where said one or more discrete photovoltaic cells is disposed between said first and second transparent elements and along at least one side of an outer perimeter of said chamber.

8. The electro-optic window of claim 7, where said one or more discrete photovoltaic cells produce a voltage ranging from about 0 volts to about 2.0 volts.

9. The electro-optic window of claim 7, where said variable transmittance component has enclosed therein a plurality of discrete photovoltaic cells.

10. The electro-optic window of claim 9, where said plurality of photovoltaic cells includes two sets, each set has at least one photovoltaic cell, and where said two sets of photovoltaic cells are electrically connected in series.

11. The electro-optic window of claim 1, where the electro-optic window is gray-scale controllable over a continuous range of transmittance.

12. An electrochromic window comprising:
   (a) a self-erasing variable transmittance component further comprising front and rear spaced transparent elements, each having front and rear faces, said rear face of said front element and said front face of said rear element sealably bonded together in a spaced-apart relationship to define a chamber therebetween, a first layer of transparent electrically conductive material disposed on said rear face of said front element and a second layer of a transparent electrically conductive material disposed on said front face of said rear element, said chamber containing an electrochromic reversible variable transmittance medium in contact with said first and second layers of transparent electrically conductive materials;
   (b) said variable transmittance component having enclosed therein one or more discrete photovoltaic cells for producing a voltage when exposed to radiant energy; and
   (c) means for conveying said voltage from said one or more discrete photovoltaic cells to said first and second layers of transparent electrically conductive materials to cause variations in light transmittance of said electrochromic medium.

13. The electrochromic window of claim 12, where said one or more discrete photovoltaic cells is disposed between said first and second transparent elements and along the outer perimeter of said chamber.

14. The electrochromic window of claim 13, where said one or more discrete photovoltaic cells produce a voltage ranging from about 0 volts to about 2.0 volts.

15. The electrochromic window of claim 12 where said means for convening said voltage includes a first strip, disposed along the outer periphery of said chamber, of an electrically conductive material connecting the bottom of said one or more discrete photovoltaic cells to said layer of transparent conductive material disposed on said front face of said rear transparent element.

16. The electrochromic window of claim 12, where said variable transmittance component has enclosed therein a plurality of discrete photovoltaic cells.

17. The electrochromic window of claim 16, where said plurality of photovoltaic cells includes two sets, each set has at least one photovoltaic cell, and where said two sets of photovoltaic cells are electrically connected in series.

18. The electrochromic window of claim 12, where said one or more photovoltaic cells includes a first set and a second set of photovoltaic cells that are electrically connected in series and where means for conveying said voltage includes:

(a) a first strip, disposed along the outer periphery of said chamber, of an electrically conductive material connects the bottom of the second photovoltaic set to said layer of transparent conductive material disposed on said front face of said rear transparent element;

(b) a first channel extends around the first photovoltaic set and extends through said layer of transparent conductive material disposed on said front face of said rear transparent element;

(c) a second strip, disposed along the outer periphery of said chamber, of an electrically conductive material connects the top of the first photovoltaic set to said layer of transparent conductive material disposed on said rear face of said front transparent element;

(d) a second channel extends around said second photovoltaic set and extends through said layer of transparent conductive material disposed on said rear face of said front transparent element; and (e) interconnecting means for electrically connecting a voltage output side of said first photovoltaic set to a voltage input side of said second photovoltaic set.

* * * * *